(12) United States Patent
Kim

(10) Patent No.: US 6,195,071 B1
(45) Date of Patent: Feb. 27, 2001

(54) TIMING CONTROL CIRCUIT OF AC TYPE PLASMA DISPLAY PANEL SYSTEM

(75) Inventor: Se-Yong Kim, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/243,448

(22) Filed: Feb. 3, 1999

(30) Foreign Application Priority Data

Jun. 30, 1998 (KR) .................................. 98-25736

(51) Int. Cl.[7] ..................................... G09G 3/28
(52) U.S. Cl. ............................. 345/60; 345/213
(58) Field of Search ................. 345/88, 75, 60, 345/66; 315/169.4, 169.1; 313/584, 585

(56) References Cited

U.S. PATENT DOCUMENTS 5,426,446    6/1995  Takei et al. ............................ 345/82
5,962,983  * 10/1999  Anderson et al. ................. 315/169.4

FOREIGN PATENT DOCUMENTS 0 837 442    4/1998  (EP) .

OTHER PUBLICATIONS

Database PAJ in EPOQUE: Patent Abstracts of Japan, vol. 98, No. 5, 1998, JP 10–013795 A (Fujitsu) Apr. 30, 1998, 1 page.

* cited by examiner

Primary Examiner—Steven J. Saras
Assistant Examiner—Uchendu O. Anyaso
(74) Attorney, Agent, or Firm—Pillsbury Winthrop LLP

(57) ABSTRACT

Disclosed is a timing circuit which produces control signals by which a data interfacing section can simultaneously implement input and output operations of a video data from a frame memory to an address electrode driving section, respectively. A first pulse signal whose pulse duration corresponds to a whole horizontal line time, a second pulse signal which is identical to a delayed first pulse signal by one horizontal line time and a third pulse signal whose pulse duration is one horizontal line time longer than that of the first pulse signal are produced by using a system clock signal of a 2 MHz frequency. During the pulse duration of the first and second pulse signals, first and second clock signals which contains 480 numbers of clock pulses with a period of one horizontal line time are produced by counting another system clock signal of a 25 MHz frequency. During the pulse duration of the third pulse signal, a third clock signal which contains 481 numbers of clock pulses with the period of one horizontal line time is produced by counting the system clock signal of the 25 MHz frequency. The first, second and third clock signals are provided to the frame memory, the address electrode driving section and the data interfacing section, respectively. By means of operations of these three clock signals, the data interfacing section can simultaneously implement the input operation of the video data of one horizontal line from the frame memory and the output operation of the video data to the address electrode driving section.

4 Claims, 3 Drawing Sheets

TIMING CONTROL CIRCUIT OF AC TYPE PLASMA DISPLAY PANEL SYSTEM

BACKGROUND OF THE INVENTION

1. Field of the Invention

The present invention relates to a flat panel display apparatus and, more particularly, to a timing control circuit of a plasma display panel (PDP) television which generates clock signals to control input/output operations of a video data to/from a data interfacing circuit.

2. Description of the Prior Art

A PDP system can be classified into an alternating current (AC) type and a direct current (DC) type according to kinds of driving voltages being applied to discharge cells. In FIG. 1, a whole circuit configuration of an AC type PDP color television which relates to the present invention is illustrated. In the AC type PDP color television, a composite video signal received through an antenna is converted into a digital data by an analog-to digital converting section 12 after being processed by an audio/video signal processing section 10. Here, one frame of the composite video signal consists of two fields, that is, an even field and an odd field which are being interlaced, and a horizontal sync signal has a frequency of about 15.73 Khz and a vertical sync signal has a frequency of about 60 Hz. After being processed by a data processing section 14 which contains a data rearranging section 14a, a frame memory section 14b and a data interfacing section 14c, the digital data is transferred to address electrode driving sections 20 and 22 in a form of a data stream which is suitable to a gradation processing characteristic of the PDP television. A high voltage generating section 18 produces control pulses, which are needed for driving an PDP by upper and lower address electrode driving sections 20 and 22, a scan electrode driving section 24 and a sustain electrode driving section 26, and by combining direct high voltages according to logic levels of control pulses from a timing control section 16. A power supplying section 30 takes an AC voltage as an input power source and produces all the DC voltages being necessary for the whole PDP system. Upper address electrode driving section 20 applies address pulses to odd address electrode lines of a plasma panel 28 in responsive to high and low levels of red-green-blue (RGB) data provided by data interfacing section 14c, and lower address electrode driving section 22 applies address pulses to even address electrode lines of plasma panel 28 in responsive to the high and low levels of the RGB data provided by data interfacing section 14c. Being supplied with a DC high voltage from a high voltage generating section 18, scanning and sustaining sections 24 and 26 provide scanning and sustaining pulses to scanning and sustaining electrode lines of plasma panel 28, respectively. Timing controlling section 16 is supplied with the vertical and horizontal sync signals from audio/video signal processing section 10, produces a data reading clock to be supplied to data rearranging section 14a, frame memory section 14b and data interfacing section 14c, and also produces various logic control pulses to be supplied to high voltage driving section 18.

Generally, for the gradation processing of the PDP, the video data of one field should be rebuilt into multiple subfields and then be rearranged, based on a significance of respective data, in an order from the most significant bit to the least significant bit. Furthermore, prior to being used as a displaying data, the video data in an interlaced scanning way should be converted into a sequential scanning way. Accordingly, frame memory section 14b is used as a data storing area for holding the RGB video data of one frame.

Particularly, data interfacing section 14c implements cyclic operations of provisionally storing the RGB data of one horizontal line of plasma panel 28 transferred from frame memory 14b, rearranging the RGB data to be suitable for an pixel arrangement of plasma panel 28 and providing the rearranged RGB data to upper and lower address electrode driving sections 20 and 22. In order to rearrange the video data of the whole 480 horizontal lines of plasma panel 28 by a data amount of one horizontal line during an addressing time of one subfield, data interfacing section 14c has two provisional data storing sections that each of them can store the data amount of one horizontal line (853×3= 2559 bits) supplied from frame memory 14b. The reason that data interfacing section 14c includes the two provisional data storing sections is to secure a continuity of data. Namely, for a smooth display of a moving picture, data interfacing section 14c simultaneously implements an input operation to receive the video data from frame memory 14b by using a first provisional data storing section and an output operation to transfer stored video data in a second provisional data storing section to address electrode driving sections 20 and 22.

In the simultaneous input/output operations of data interfacing section 14c, input/output timings of the video data can be characterized as follows. Data interfacing section 14c implements only the input (receiving) operation of the video data because the second provisional data storing section does not have a stored video data during a time interval for loading the video data of a first horizontal line among one subfield to the first provisional data storing section. On the contrary, data interfacing section 14c implements only the output operation of the video data because no video data is supplied from frame memory 14b during a time interval for outputting the video data of a last horizontal line among the subfield to the address electrode driving sections 20 and 22. Accordingly, during the addressing time of one subfield, one final time that the video data is outputted from data interfacing section 14c is behind another final time that the video data is inputted to data interfacing section 14c by a delay-time being taken for an input (or output) of the video data of the one horizontal line. The delay-time is about 3 microseconds.

Data interfacing section 14c implements the input and output operations of the video signal under a control of control signals produced by timing control section 16. Accordingly, timing control section 16 is requested to produce the control signals suitable for characteristics of input/output operations of the video data of data interfacing section 14c as above.

SUMMARY OF THE INVENTION

Therefore, in order to settle the problems of the prior art as described above, it is an object of the present invention to provide a circuit for producing timing control signals to be used for controlling, so that the two provisional data storing sections can simultaneously implement the input and output operations when the data interfacing section which has two provisional data storing sections interfaces the video data from the frame memory to the address electrode driving sections.

In order to achieve the object, there is provided a timing control circuit for a plasma display panel which includes at least a frame memory means, a data interfacing means and an address electrode driving means, comprising:

a first pulse signal generating means for generating a first pulse signal whose level is periodically logic-high with correspondence to a first time interval within which the data interfacing means receives a video data of a whole horizontal line of a plasma panel from the frame memory means;

a second pulse signal generating means for generating a second pulse signal whose level is periodically logic-high with correspondence to a second time interval within which the data interfacing means transfers the video data of the whole horizontal line of the plasma panel to the address electrode driving means;

a third pulse signal generating means for generating a third pulse signal whose level is periodically logic-high with correspondence to a third time interval within which the data interfacing means receives the video data of the whole horizontal line of the plasma panel from the frame memory means and transfers the video data of the whole horizontal line of the plasma panel to the address electrode driving means;

a first clock signal generating means for generating a first clock signal which controls the frame memory means to transfer the video data by a unit of one horizontal line data per period to the data interfacing means by using the first pulse signal and a system clock signal of a predetermined frequency;

a second clock signal generating means for generating a second clock signal which controls the address electrode driving means to receive the one horizontal line data of a previous period stored in the data interfacing means by using the second pulse signal and the system clock signal; and a third clock signal generating means for generating a third clock signal which controls the data interfacing means to be synchronized with an output operation of the frame memory means and an input operation of the address electrode driving means in receiving the video data from the frame memory means and transferring the previously received video data to the address electrode driving means, wherein the second pulse signal is identical to a delayed first pulse signal by a time of one horizontal line, the first and second pulse signals include a P number of clock pulses, where the numerical value P is identical to a whole horizontal line number of the plasma panel, and the third pulse signal includes a P+1 number of clock pluses.

BRIEF DESCRIPTION OF THE DRAWINGS

The above object and other advantages of the present invention will become more apparent by describing in detail preferred embodiments thereof with reference to the attached drawings, in which.

DESCRIPTION OF THE PREFERRED EMBODIMENTS

Hereinafter, a preferred embodiment of the present invention will be explained in more detail with reference to the accompanying drawings.

Figure 1:
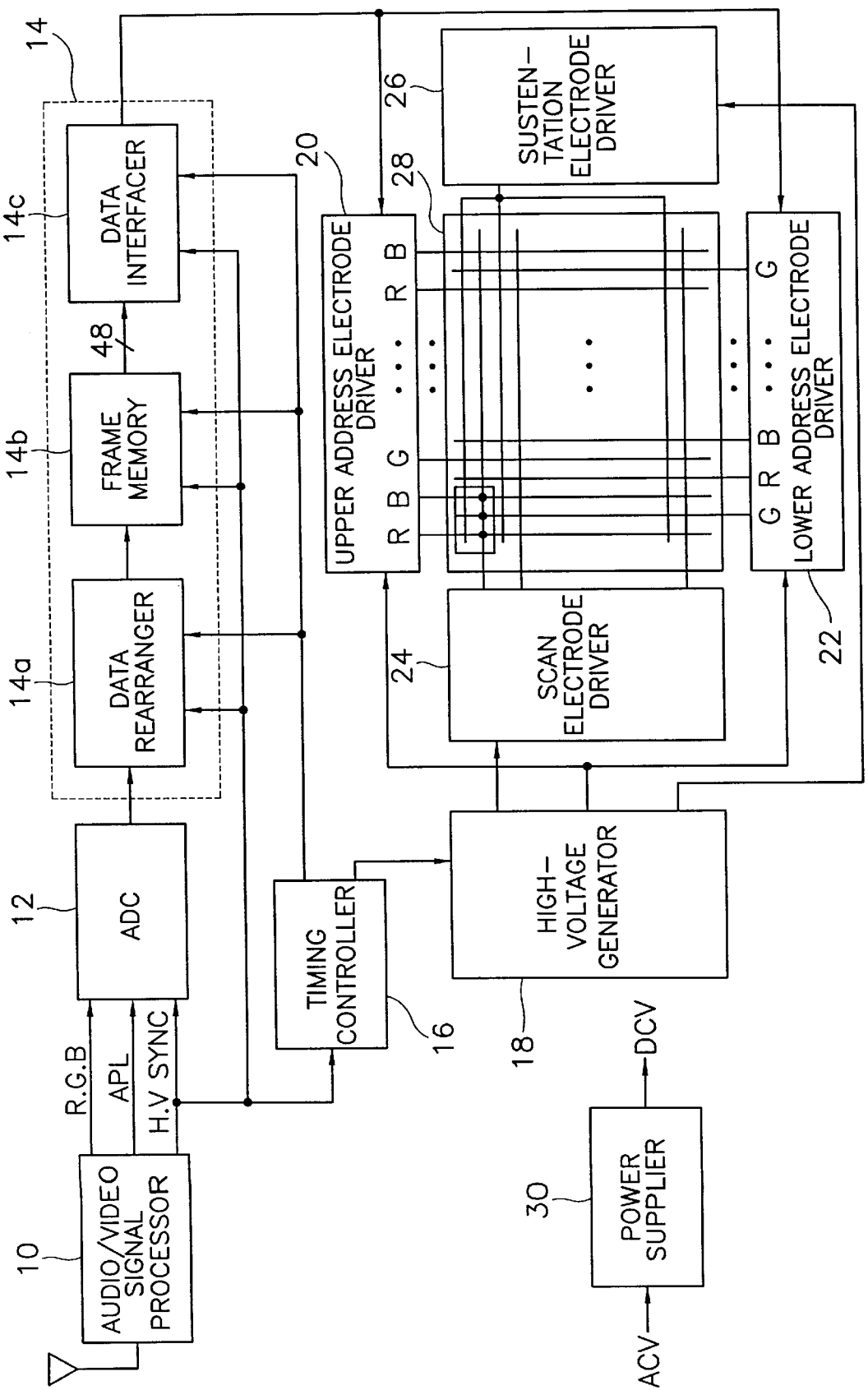
FIG. 1 is a block diagram illustrating a circuit configuration of an AC type of PDP color television set to which the present invention is applied.
Figure 2:
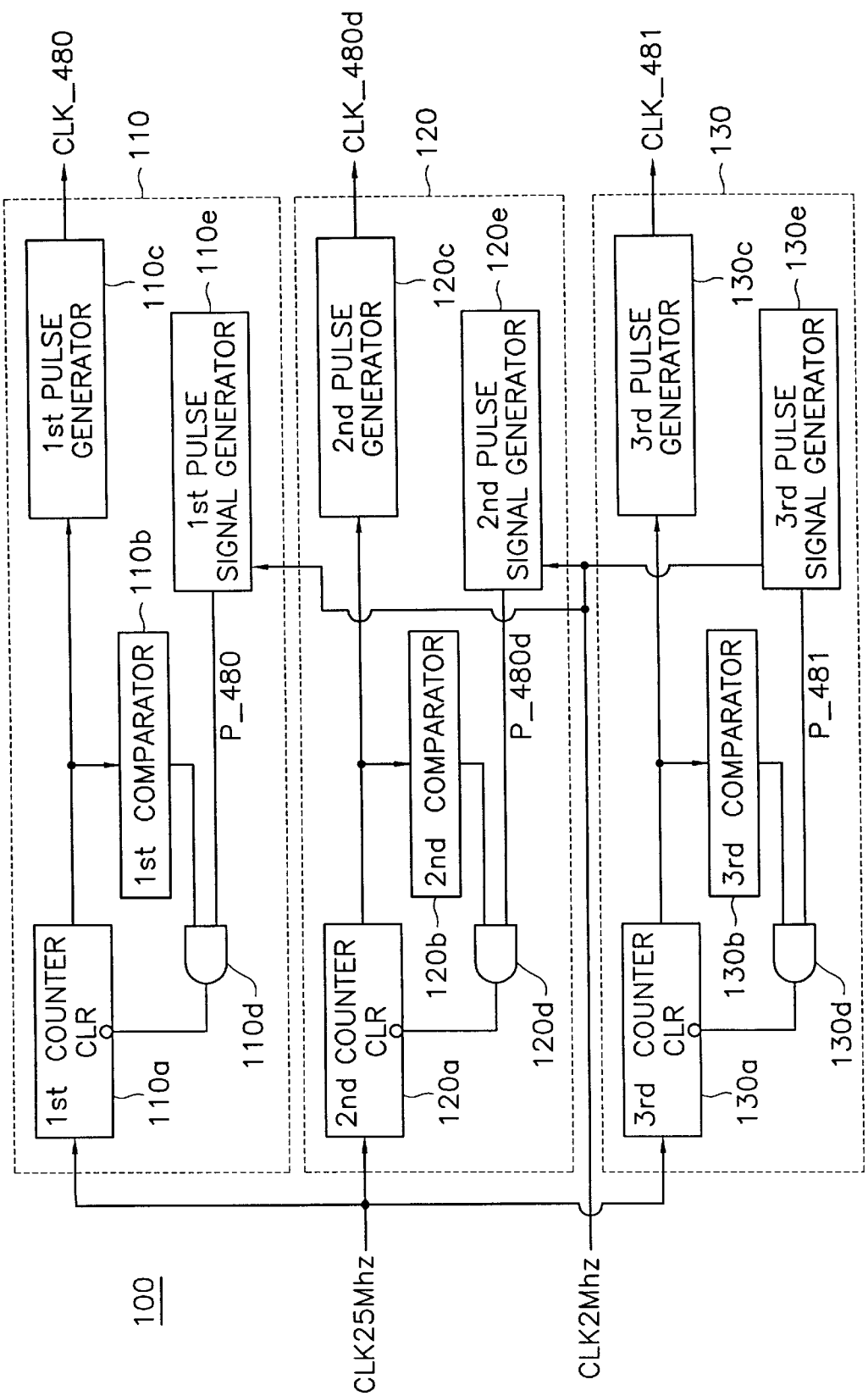
FIG. 2 illustrates a timing control circuit according to an embodiment of the present invention.

In FIG. 2, a circuit configuration of a timing circuit 170 according to the embodiment of the present invention is illustrated. Timing control circuit 170 is a portion of timing control section 16 as shown in FIG. 1 and consists of a first clock signal generating section 110, a second clock signal generating section 120 and a third clock signal generating section 130.

First clock signal generating section 110 generates a first clock signal CLK_480 to control an input operation of a video data of data interfacing section 14c. For this, first clock signal generating section 110 uses two signals: an output signal of a first counter 110a which uses a system reference clock signal CLK25M of a 25 MHz frequency as an input signal and a first periodic pulse signal P_480 whose logic level is high during a time interval for data interfacing section 14c in order to receive a video data corresponding to whole horizontal lines (480 lines) of plasma panel 28 from frame memory 14b.

More particularly, first clock pulse generating section 110 consists of first counter 110a which counts system reference clock CLK25M to sequentially output numerical values from 0 to 74, a first comparator 110b for providing a logic-low signal when the counted value by first counter 110a becomes equal to 74, a first AND-gate 110d for logically multiplying an output signal of first comparator 110b by first periodic pulse signal P_480 and for providing the logically multiplied signal to a clear terminal of first counter 110a, and a first pulse generator 110e for providing first clock signal CLK_480 with a 3 micro-seconds period whose logical level is alternately inverted at every time when the counted values of first counter 110a become equal to 0 and 37. Here, the 3 micro-seconds correspond to one horizontal line time. Especially, in an addressing time of respective subfields, first pulse generator 110e takes a system clock signal CLK2M of a 2 MHz frequency as an input signal to be counted by a binary counter (not shown) therewithin and produces first periodic pulse signal P_480 whose logic-high level is sustained during a time interval for data interfacing section 14c to receive the video data corresponding to the whole 480 numbers of the horizontal lines of plasma panel 28 that receives from frame memory 14b, based on the counts of the binary counter.

Second clock signal generating section 120 generates a second clock signal CLK_480d to control an output operation of the video data of data interfacing section 14c. For this, second clock signal generating section 120 uses two signals: an output signal of a second counter 120a which also uses system reference clock signal CLK25M as an input signal and a second periodic pulse signal P_480d whose logic level is high during a time interval for data interfacing section 14c in order to provide the video data corresponding to the whole horizontal lines (480 lines) of plasma panel 28 to upper and lower address electrode driving sections 20 and 22.

In detail, second clock pulse generating section 120 consists of second counter 120a which counts system reference clock CLK25M to sequentially output numerical values from 0 to 74, a second comparator 120b for providing a logic-low signal when the counted value by second counter 120a becomes equal to 74, a second AND-gate 120d for logically multiplying an output signal of second comparator 120b by second periodic pulse signal P_480d and for providing the logically multiplied signal to a clear terminal of second counter 120a, and a second pulse generator 120e for providing second clock signal CLK_480d with a 3 micro-seconds period whose logical level is alternately inverted at every time when the counted values of second counter 110a become equal to 0 and 37. In the same way, second pulse generator section 120e takes system clock signal CLK2M as an input signal to be counted by a binary counter (not shown) therewithin and produces second periodic pulse signal P_480d whose logic-high level is sustained during a time interval for transferring the video data corresponding to the whole 480 numbers of the horizontal lines of plasma panel 28 from data interfacing section 14c to upper and lower address electrode driving section 20 and 22, based on the counts of the binary counter.

Third clock signal generating section 130 generates a third clock signal CLK_481 to control input/output operations of the video data of data interfacing section 14c. For this, third clock signal generating section 130 uses two signals: an output signal of a third counter 130a which uses system reference clock signal CLK25M as an input signal and third periodic pulse signal P_481 whose logic level is high during a time which is taken by data interfacing section 14c for a receipt of the video data of the whole 480 horizontal lines from frame memory 14b and for a transfer of them to upper and lower address electrode driving sections 20 and 22.

In detail, third clock pulse generating section 130 consists of third counter 130a which counts system reference clock CLK25M to sequentially output numerical values from 0 to 74, a third comparator 130b for providing a logic-low signal when the counted value by second counter 130a becomes equal to 74, a third AND-gate 130d for logically multiplying an output signal of third comparator 130b by third periodic pulse signal P_481 and for providing the logically multiplied signal to a clear terminal of third counter 130a, and a third pulse generator 130e for providing third clock signal CLK_481 with a 3 micro-seconds period whose logical level is alternately inverted at every time when the counted values of third counter 130a become equal to 0 and 37. Third pulse generator 130e also takes system clock signal CLK2M as an input signal to be counted by a binary counter (not shown) therewithin and produces the third periodic pulse signal P_481 whose logic-high level is sustained during a time interval from a first time for data interfacing section 14c in order to initiate a receipt of the video data corresponding to the whole 480 numbers of the horizontal lines of plasma panel 28 from frame memory 14b to a second time for data interfacing section 14c in order to complete a transfer of the received video data to upper and lower address electrode driving section 20 and 22, based on the counts of the binary counter.

Since each of first to third counters 110a, 120a and 130a should count up to at least the numerical value 74, counters of 7-bits or more are recommended as the three counters.

Figure 3:
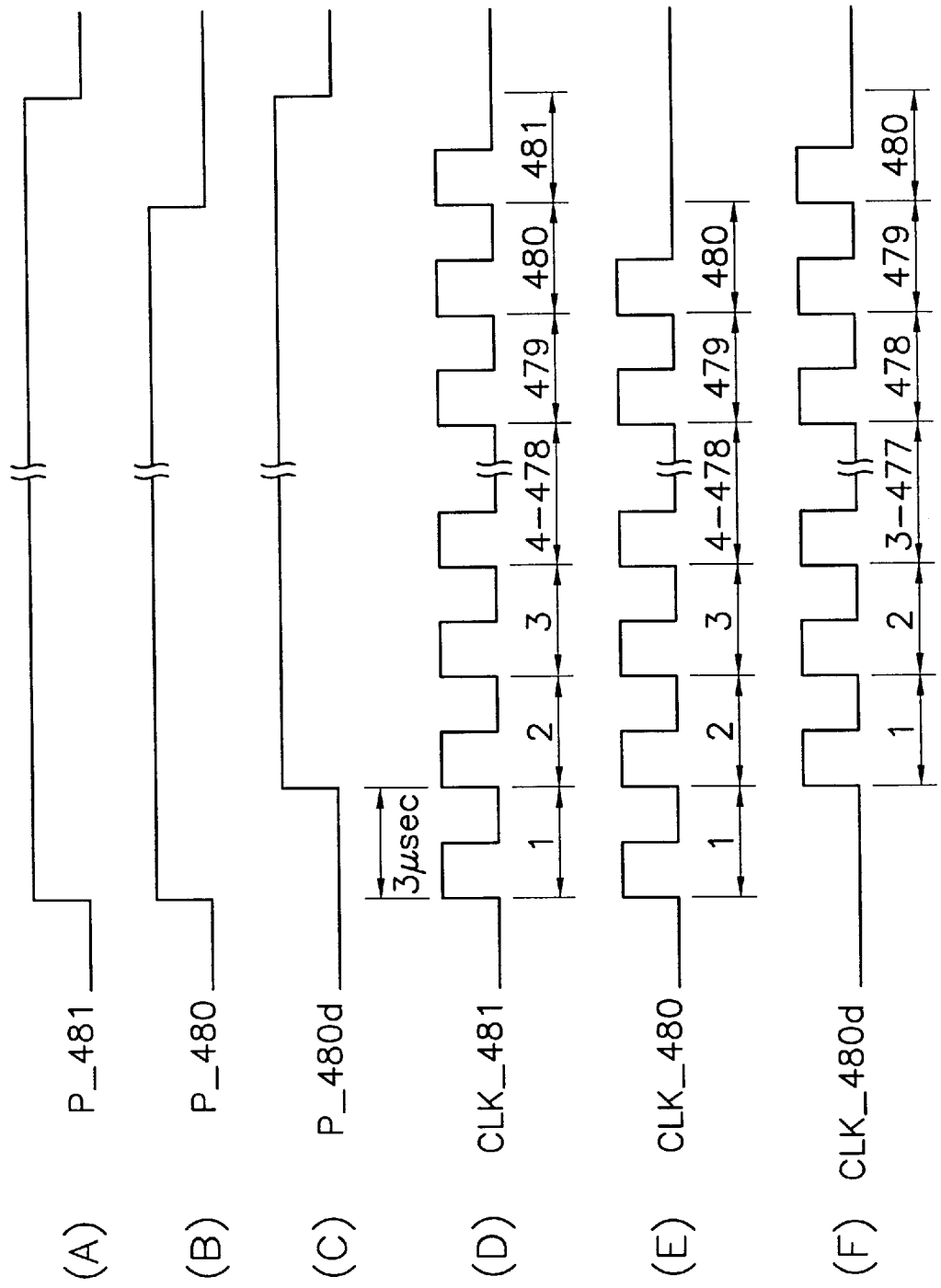
FIG. 3 illustrates a timing chart of control signals relating to the timing control circuit shown in FIG. 2.

FIG. 3 depicts a timing chart for first to third periodic pulse signals P_480, P_480d & P_481 and first to third clock signals CLK_480, CLK_480d & CLK_481. Referring to the timing chart, operations of timing control circuit 100 are explained in detail as follows.

As each of first to third counters 110a, 120a & 130a has to produce a pulse stream with a 3 micro-seconds period from system reference clock signal CLK25M with the 25 MHz (40 nano-seconds) frequency, 75 numbers of counted values from 0 to 74 are sequentially outputted from each of first to third counters 110a, 120a & 130a. For these outputs, respective pairs of comporator and AND-gate 110b & 110d, 120b & 120d, and 130b & 130d have respective counters 110a, 120a, and 130a cleared at a proper time. Namely, when respective first to third periodic pulse signals $P_{13}$ 480, P_481 and P_481 have logic-low levels or when respective comparators 110b, 120b and 130b output logic-low signals as the counted value of respective counters 110a, 120a, and 130a being 74, respective counters 110a, 120a, and 130a are cleared by a logic-low clear pulse inputted through respective clear terminals and thus periodically output cyclic numerical values from 0 to 74. At the same time, respective first to third pulse generators 110c, 120c and 130c produce clock pulses whose logical levels are inverted at every time when the output values of respective counters 110a, 120a and 130a become equal to 0 and 35.

Meanwhile, a cyclic operation of first counter 110a to output all the output values from 0 to 74 is initiated at a rising edge of first periodic pulse signal P_480 and is finished at a falling edge of first periodic pulse signal P_480. Accordingly, as can be known from FIG. 3 (E), first pulse generator 110c can produce first clock signal CLK_480 including 480 numbers of pulses with a 3 micro-seconds period during a time when the logic-level of first periodic pulse signal P_480 remains high.

Similarly, a cyclic operation of second counter 120a to output all the output values from 0 to 74 is initiated at a rising edge of second periodic pulse signal P_480d depicted in FIG. 3 (C) and is finished at a falling edge of second periodic pulse signal P_480d. Accordingly, as can be known from FIG. 3(F), second pulse generator 120c can produce second clock signal CLK_480d including 480 numbers of pulses with a 3 micro-seconds period during a time when the logic-level of second periodic pulse signal P_480d remains high. However, being compared to first clock signal CLK_480, second clock pulse signal CLK_480d is delayed by one horizontal line time (3 micro-seconds).

Furthermore, a cyclic operation of third counter 130a to output all the output values from 0 to 74 is initiated at a rising edge of third periodic pulse signal P_481 depicted in FIG. 3(A) and is finished at a falling edge of third periodic pulse signal P_481. Accordingly, as can be known from FIG. 3(D), third pulse generator 130c can produce third clock signal CLK_481 including 481 numbers of pulses with a 3 micro-seconds period during a time when the logic-level of third periodic pulse signal P_481 remains high.

Since a time for frame memory 14b to provide the video data to data interfacing section 14c is one clock period earlier than a time for address electrode driving sections 20 and 22 to receive the video data provided by frame memory 14b from data interfacing section 14c, first and second clock signals CLK_480 and CLK_480d should be provided to frame memory 14b and address electrode driving sections 20 and 22, respectively. Third clock signal CLK_481 should be provided to data interfacing section 14c since data interfacing section 14c has to be kept in an enable state during input and output operations of one frame of the video data.

In the results, by means of a combined function of first and third clock signals CLK_480 and CLK_481, the video data of one horizontal line per clock period (3 microseconds) is transferred from frame memory 14b to data interfacing section 14c. Simultaneously with the transfer, the video data of one horizontal line which has been loaded to data interfacing section 14c during a previous clock period is transferred to address electrode driving sections 20 and 22 by means of a combined function of second and third clock signals CLK_480d and CLK_481.

Especially, in the embodiment of the present invention, pulse timings of first and second clock signals CLK_480 and CLK_480d are correctly synchronized with each other because both first and second clock signal generating sections 110 and 120 commonly use system reference clock signal CLK25M as input signals thereof. Consequently, as being controlled by first and second clock signals CLK__480 and CLK__480d, data interfacing section 14c can also correctly implement the input and output operations of the video data. Pulse timings of third clock signal CLK__481 are also synchronized with those of first and second clock signals CLK__480 and CLK__480d because third clock signal CLK__481 is generated from common system reference clock signal CLK25M.

Therefore, the timing control circuit of the PDP television set according to the present invention ensures correct input and output operations of the video data of the data interfacing section by providing control clock signals whose timings are consistent with the others.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A timing control circuit for a plasma display panel which includes at least a frame memory means, a data interfacing means and an address electrode driving means, comprising:

a first pulse signal generating means for generating a first pulse signal whose level is periodically logic-high with correspondence to a first time interval within which the data interfacing means receives a video data of a whole horizontal line of a plasma panel from the frame memory means;

a second pulse signal generating means for generating a second pulse signal whose level is periodically logic-high with correspondence to a second time interval within which the data interfacing means transfers the video data of the whole horizontal line of the plasma panel to the address electrode driving means;

a third pulse signal generating means for generating a third pulse signal whose level is periodically logic-high with correspondence to a third time interval within which the data interfacing means receives the video data of the whole horizontal line of the plasma panel from the frame memory means and transfers the video data of the whole horizontal line of the plasma panel to the address electrode driving means;

a first clock signal generating means for generating a first clock signal which controls the frame memory means to transfer the video data by a unit of one horizontal line data per period to the data interfacing means by using the first pulse signal and a system clock signal of a predetermined frequency;

a second clock signal generating means for generating a second clock signal which controls the address electrode driving means to receive the one horizontal line data of a previous period stored in the data interfacing means by using the second pulse signal and the system clock signal; and a third clock signal generating means for generating a third clock signal which controls the data interfacing means to be synchronized with an output operation of the frame memory means and an input operation of the address electrode driving means in receiving the video data from the frame memory means and transferring the previously received video data to the address electrode driving means, wherein the second pulse signal is identical to a delayed first pulse signal by a time of one horizontal line, the first and second pulse signals include a P number of clock pulses, where the numerical value P is identical to a whole horizontal line number of the plasma panel, and the third pulse signal includes a P+1 number of clock pluses.

2. The timing control circuit as claimed in claim 1, wherein the first clock signal generating means comprises a counter for sequentially outputting numerical values from 0 to N by counting the system clock signal; a comparator for outputting a logic-low signal when an output numerical value from the counter is equal to the numerical value N; an AND gate for providing an output signal obtained by logically multiplying an output signal from the comparator by the first pulse signal to a clear terminal of the counter; and a pulse generator for generating the first clock signal whose period is identical to the time of the one horizontal line by inverting an output signal level thereof at every 0 and N/2 of the numerical values outputted from the counter.

3. The timing control circuit as claimed in claim 1, wherein the second clock signal generating means comprises a counter for sequentially outputting numerical values from 0 to N by counting the system clock signal; a comparator for outputting a logic-low signal when an output numerical value from the counter is equal to the numerical value N; an AND gate for providing an output signal obtained by logically multiplying an output signal from the comparator by the second pulse signal to a clear terminal of the counter; and a pulse generator for generating the second clock signal whose period is identical to the time of the one horizontal line by inverting an output signal level thereof at every 0 and N/2 of the numerical values outputted from the counter.

4. The timing control circuit as claimed in claim 1, wherein the third clock signal generating means comprises a counter for sequentially outputting numerical values from 0 to N by counting the system clock signal; a comparator for outputting a logic-low signal when an output numerical value from the counter is equal to the numerical value N; an AND gate for providing an output signal obtained by logically multiplying an output signal from the comparator by the third pulse signal to a clear terminal of the counter; and a pulse generator for generating the third clock signal whose period is identical to the time of the one horizontal line by inverting an output signal level thereof at every 0 and N/2 of the numerical values outputted from the counter.

* * * * *